United States Patent
Kierath et al.

(10) Patent No.: US 6,325,425 B1
(45) Date of Patent: Dec. 4, 2001

(54) HOSE COUPLING

(75) Inventors: Timothy R. Kierath; Leon Ernst, both of New South Wales (AU)

(73) Assignee: Hoselink Pty Limited, New South Wales (AU)

( * ) Notice: Subject to any disclaimer, the term of this patent is extended or adjusted under 35 U.S.C. 154(b) by 0 days.

(21) Appl. No.: 09/367,643

(22) PCT Filed: Mar. 16, 1998

(86) PCT No.: PCT/AU98/00180

§ 371 Date: Aug. 17, 1999

§ 102(e) Date: Aug. 17, 1999

(87) PCT Pub. No.: WO98/41791

PCT Pub. Date: Sep. 24, 1998

(30) Foreign Application Priority Data

Mar. 14, 1997 (AU) .................................. PO 5627

(51) Int. Cl.$^7$ .................................. F16L 37/248
(52) U.S. Cl. .................. 285/352; 285/361; 285/402; 285/65
(58) Field of Search .............. 285/65, 70, 352, 285/360, 376, 401, 73, 361, 396, 402

(56) References Cited

U.S. PATENT DOCUMENTS

| 489,107 | * | 1/1893 | Storz | 285/352 |
| 2,204,392 | * | 6/1940 | Arm | 285/352 |
| 2,250,199 | | 7/1941 | Kelly . | |
| 3,129,959 | * | 4/1964 | Kuzma | 285/352 |
| 3,831,984 | | 8/1974 | Kutina et al. . | |
| 3,858,910 | | 1/1975 | Oetiker . | |
| 4,146,288 | | 3/1979 | Ramsay et al. . | |
| 4,443,028 | | 4/1984 | Hayes . | |
| 5,645,302 | * | 7/1997 | Horimoto | 285/70 |

FOREIGN PATENT DOCUMENTS

| 27474/67 | 9/1967 | (AU) . |
| A-78949/87 | 1/1988 | (AU) . |
| B-58395/90 | 1/1991 | (AU) . |
| A-52268/96 | 1/1997 | (AU) . |
| 3825866 A1 | 7/1988 | (DE) . |
| 196 04 728 C1 | 2/1996 | (DE) . |
| 0 132 603 | 2/1985 | (EP) . |
| 0 748 975 A1 | 5/1996 | (EP) . |
| WO83/00543 | 2/1983 | (WO) . |

* cited by examiner

Primary Examiner—Teri Pham Luu
(74) Attorney, Agent, or Firm—Skinner & Associates

(57) ABSTRACT

A connector (1) for flexible fluid lines, such as garden water hoses, comprising a universal body member (3) which is common to all interconnecting components of the system, wherein there is a twist-together, twist-apart bayonet connection between component parts (1 and 7), wherein the locking lug (14) of the first component (1) engages a groove in the inner coupling member (8) of the second component (7), and the locking lug (14) of the second component (7) engages a groove in the inner coupling member (5) of the first component (1).

10 Claims, 5 Drawing Sheets

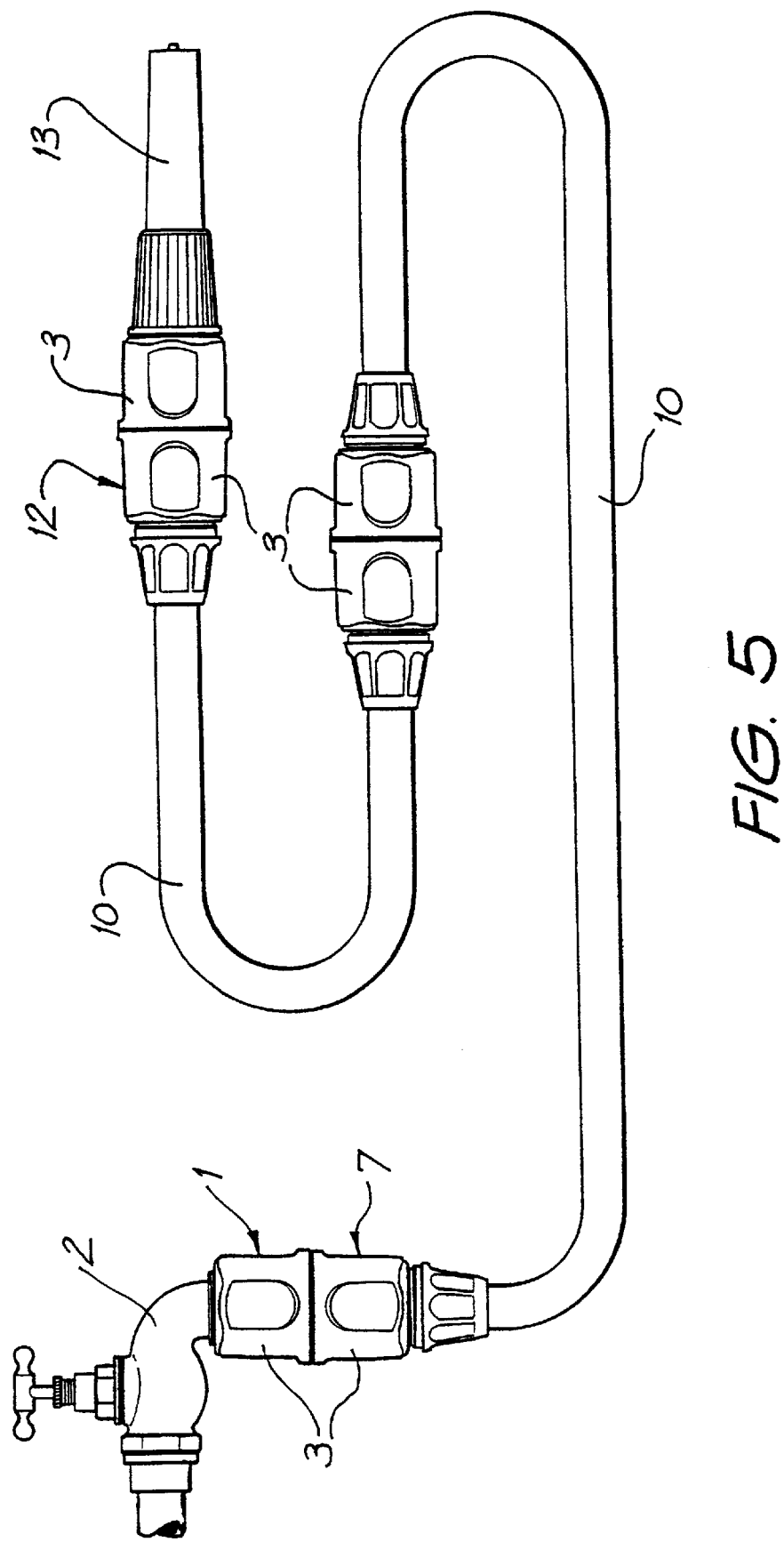

HOSE COUPLING

TECHNICAL FIELD

The present invention relates to improvements in fittings for flexible fluid lines, such as (but not limited to) water hoses and the like.

BACKGROUND ART

It has been found with existing fittings that they are either too complex in construction and do not work, or that the design is too simplistic and either do not work efficiently or fail under pressure or in operation. Examples of prior art hose couplings are to be found in U.S. Pat. Nos. 4,146,288 (Ramsay), 3,831,984 (Kutina) and 2,250,199 (Kelly); Australian patent application Nos. 78949/87 (Bortolin), 85889/82 (Mining Supplies (Minsup) Pty Ltd) and 27474/67 (Lindsay); and International Patent Publication No. WO91/00469 (Hampel Engineering Pty Ltd), now Australian Patent No. 642654.

Hampel has attempted to overcome the problems or differences of the prior art by providing, a universal fluid line interlocking connector, which has inherent problems in that the main body cannot be economically mass produced due to the design of its components. In addition, at least four main body fittings are required to provide standard fluid line connections between, for example, a water tap, hose retention, hose nozzle and accessories such as sprinklers, and the like.

In addition, Hampel's hose retention design is deficient because the hose disengages when the mains water pressure is high, and it tends to leak.

DISCLOSURE OF THE INVENTION

It is an object of the present invention to provide new or improved fittings for flexible fluid lines which overcome or at least minimise the prior art problems or limitations outlined above, or at the very least which provide an alternative construction which is a useful choice to the public.

It is another object of the present invention to provide improved fittings for flexible fluid lines which are universally adaptable for use with a variety of different types of domestic or garden hose fittings.

It is a further object of the present invention to provide improved fittings for flexible fluid lines which are relatively simple in construction and relatively inexpensive to manufacture.

These and other objects of this invention will become more apparent from the following descriptions and the drawings.

According to one aspect of the present invention there is provided a connector for a flexible fluid line, said connector comprising a first universal body member having a passageway extending axially therethrough from one end to the other or opposite end thereof, an inner coupling member coaxially disposed and fixed within said universal body member having a passageway extending axially therethrough from one end to the other or opposite end thereof, a locking lug depending from adjacent the peripheral edge of one end of the universal body member and having an inwardly directing flange about its outer end adapted to connect said body member end to end with a second or further connector comprising a second universal body member with an inner coupling member coaxially disposed therein and with a locking, lug depending from adjacent the peripheral edge of the second universal body member interfacing with the first universal body member, wherein the first and second universal body members are mutually rotatable relative to one another to effect a bayonet-type coupling wherein the locking lug depending from the first universal body member is located in a peripheral groove formed in the side edge of the inner coupling member of the second universal body member, and wherein the locking lug depending from the second universal member is located in a peripheral groove formed in the side edge of the inner coupling member of the first universal body member, whereby the outer end of the inner coupling member of the first universal body member interfaces and sealingly engages the outer end of the inner coupling member of the second universal body member.

According to the invention, the fitting or connector for flexible fluid lines comprises a universal body member which is conjoined to one of a range of variable adaptor members to establish a variety of composite fittings according to the required function thereof, including:

a tap connector a hose joiner (e.g. for 13 mm hose or 18 mm hose)

a hose nozzle an adapter for a standard hose coupling an adapter for a standard sprinkler or other accessory fitting with a standard thread (e.g. 18 mm BSP female)

Whereas the fitting for a flexible fluid line according to the present invention has a universal body member which is conjoined to a range of different adapter members to provide a variety of composite fittings, the prior art Hampel system requires the fabrication of separate integral fittings. For example, in order for the Hampel system to "fit up" a hose—i.e. to a tap at one end with a spray nozzle at the opposite end—requires the manufacture of four main bodies, each with identical bayonet connection means at one end thereof but with the opposite end thereof being fabricated to one of a number of different configurations or designs for a dedicated function or use.

The present invention provides fittings for flexible fluid lines, such as water hoses, which permit different sized hoses to attach to a water tap at one end and to provide for the connection of a spray nozzle or other watering accessory items at the opposite end of the hose. The fittings are designed to withstand high internal pressures, and are suitable for the transmission of other fluids and pressurised air.

Connections according to preferred embodiments of the invention are by way of a bayonet fit. The two faces of adjacent fittings which come together by way of such a bayonet fit are identical, i.e. there is no male or female end. According to the present invention, either end of the hose can be connected to a tap or to other fittings.

BRIEF DESCRIPTION OF THE ACCOMPANYING DRAWINGS

This invention will now be described by way of example only with reference to the accompanying drawings, wherein:

FIG. 5 is a schematic representation of some of the interconnected components of one form of a garden hose system according to the present invention.

BEST MODE OF CARRYING OUT THE INVENTION

Figure 1:
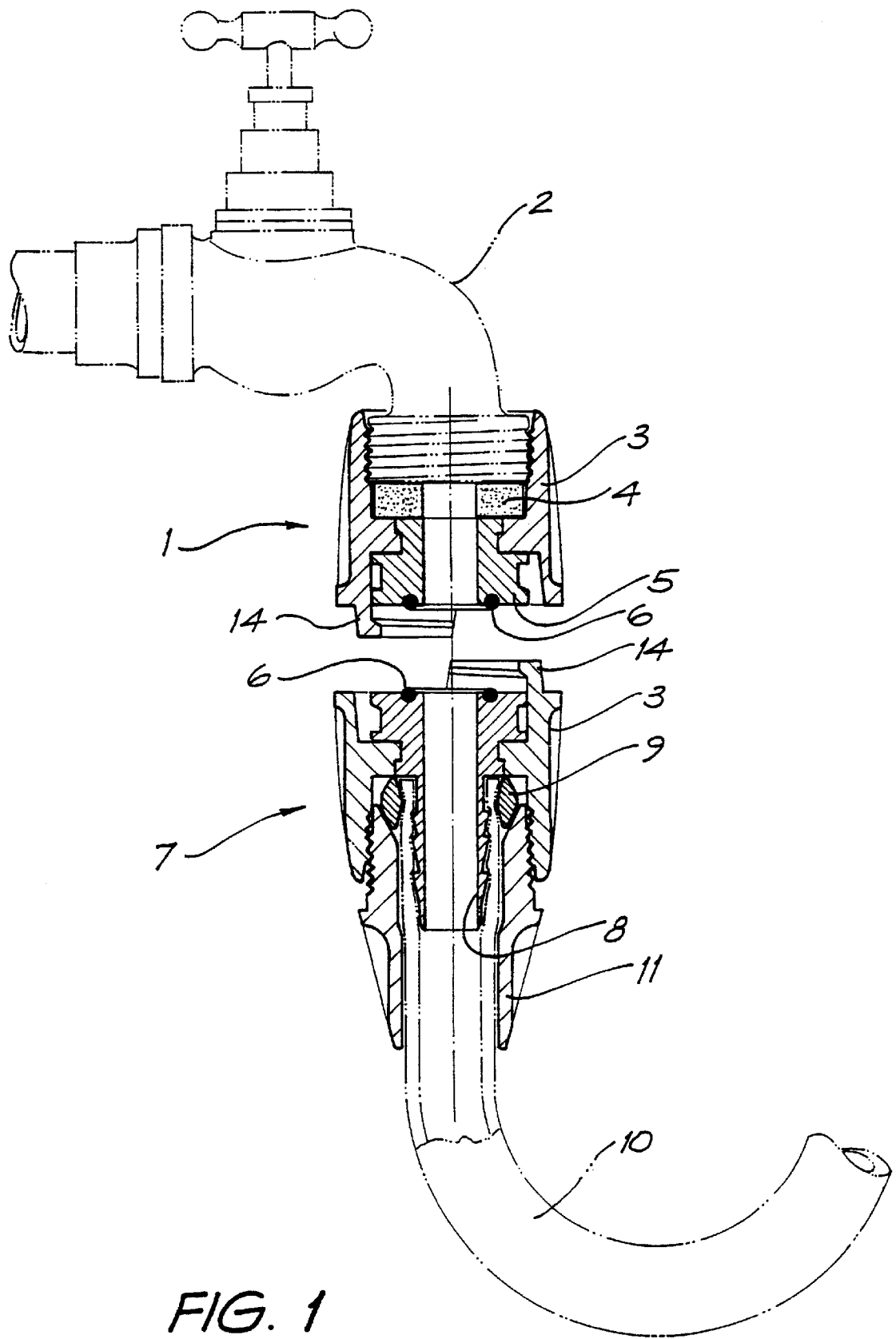
FIG. 1 is a cross-sectional view of a coupling for flexible fluid lines according to the present invention, illustrating the connection of a flexible hose to a water tap.

Referring to FIG. 1, a hose connector system comprises a tap-end connector 1 attached to a water tap 2 and wherein said connector 1 comprises a universal body member 3 screw threaded on to tap 2 and sealed by washer 4.

The universal body member 3 has an inner coupling member 5 which is snap-fitted or attached to the body member 3 by means of a bayonet coupling. An O-ring 6 is provided at the lower end of the inner coupling 5 for sealing against a similar or like O-ring 6 of the inner coupling hose connector member 8 of the hose-end connector 7. The hose-end connector 7 comprises a universal body member 3 similar to that comprising the tap-end connector 1. The inner coupling hose connector 8 has a depending spigot for attachment of a flexible hose 10, held in place by the hose lock circlip 9 and hose clamp collar or nut 11. As with the inner coupling 5, the inner coupling hose connector 8 is snap-fitted or bayonet connected into its universal body member 3.

Coupling between the tap-end connector 1 and the hose-end connector 7 is by means of a twist-together, twist-apart bayonet connection between the lugs 14 on each of the connectors 1 and 7, engaging respective keyways formed on each external end of the inner coupling members 5 and 8.

Figure 2:
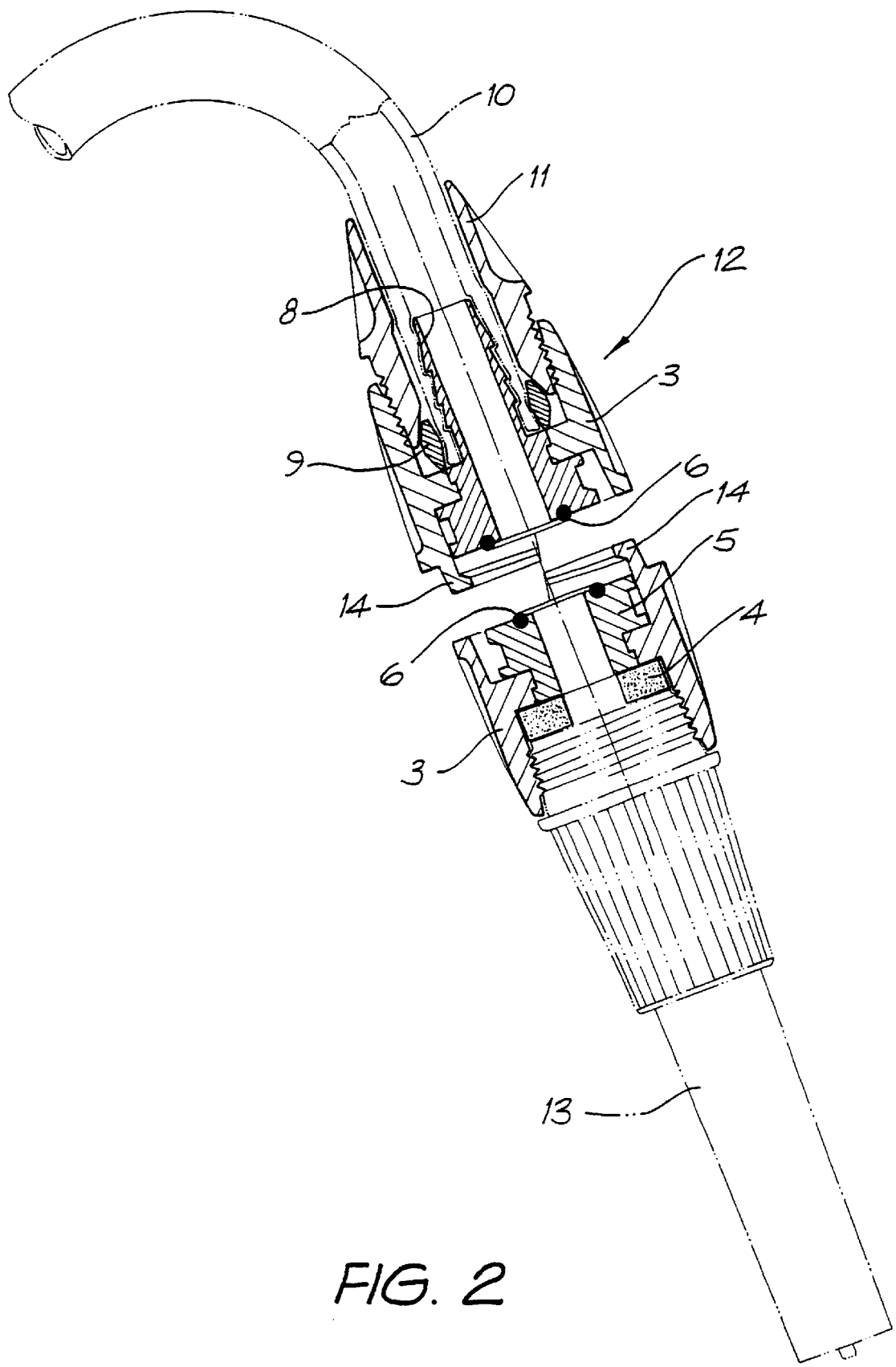
FIG. 2 is a cross-sectional view of the opposite end of the hose, showing the attachment of accessories, in this case a spray nozzle.

Similarly, the connector between the hose and accessories is by bayonet connections. For example, as shown in FIG. 2, a watering spray nozzle 13 is screwed into one end of a universal body member 3, with a water tight seal being formed with the aid of a washer 4. The inner coupling 5 is similar to that which is illustrated for the tap-end connector 1, in FIG. 1. Again, the universal body 3 of the accessory (spray nozzle 13) is a bayonet connected to the hose end connector 12, which is similar to the hose-end connector 7 at the opposite end of the flexible hose 10. Again, coupling between the accessory end connector and the hose-end connector 12 is by means of a twist-together, twist-apart bayonet connection between the lugs 14 on each of the connectors, engaging respective keyways formed on each external end of the inner coupling members 5 and 8. The flexible hose 10 is connected to the hose-end connector 12 in a similar manner to that described hereinabove, for connection of the hose 10 to the hose-end connector 7.

Figure 3:
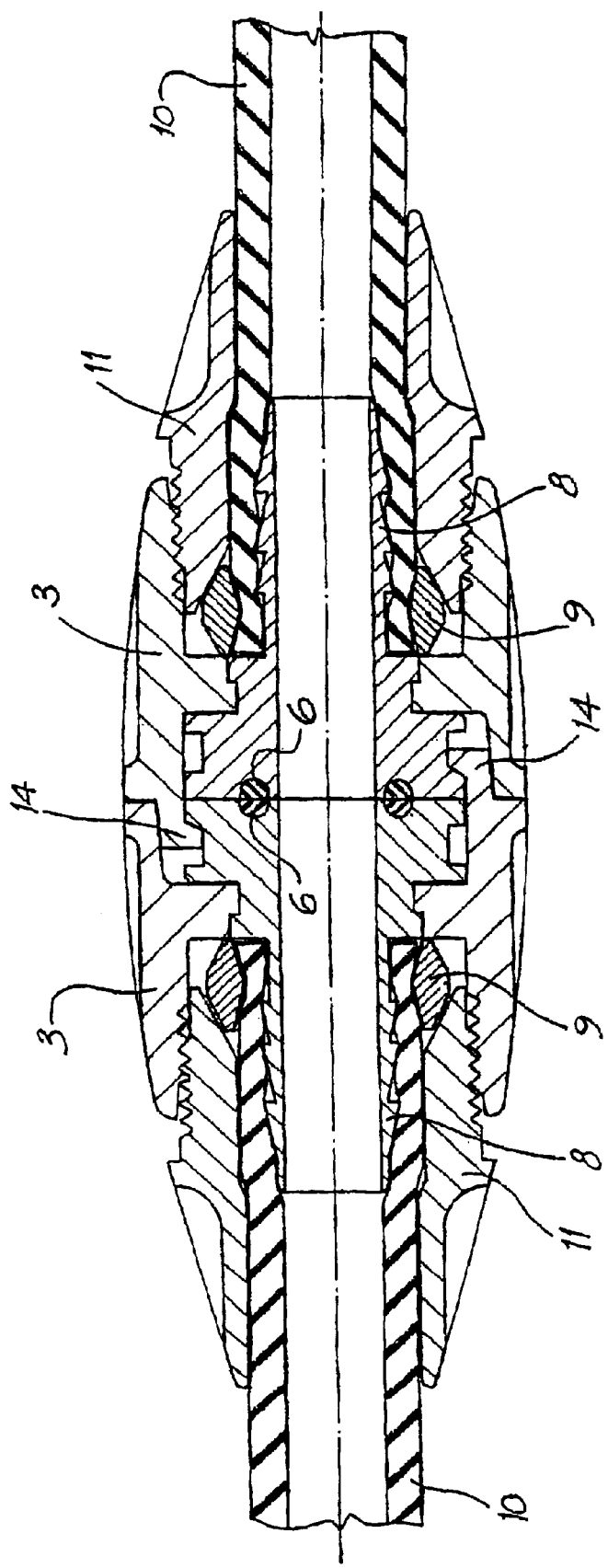
FIG. 3 is a cross-sectional view of a coupling for interconnecting two lengths of hose, shown in the connected or engaged position.
Figure 4:
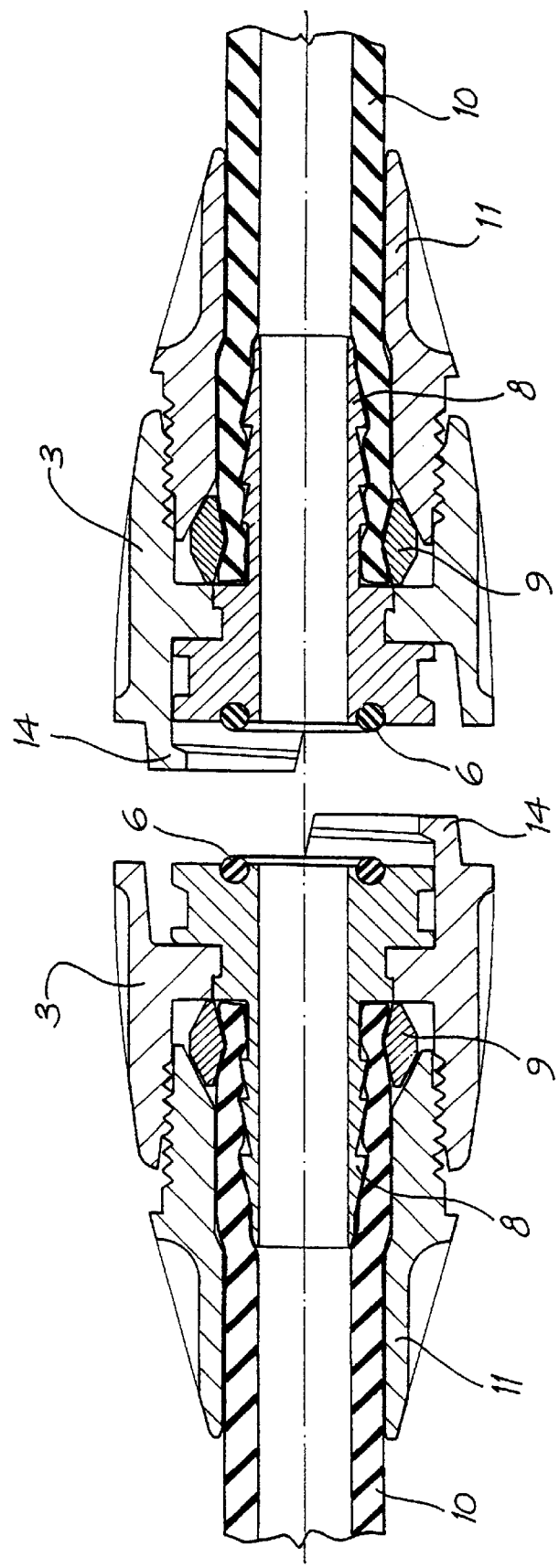
FIG. 4 is a cross-sectional view of the hose coupling of FIG. 4, shown in the disengaged position.

FIGS. 3 and 4 illustrate the coupling for interconnecting two lengths of hose. FIG. 3. illustrates the engaged or coupled mode, whereas FIG. 4 illustrates the uncoupled mode. The hose-end couplings in each case are similar to the hose-end couplings 7 and 12, as illustrated in FIGS. 1 and 2, respectively. Again, there is twist-together, twist-apart bayonet connection between the opposed hose-end connectors, with lugs 14 on each body member 3 engaging the respective keyway formed on the outer ends of the opposed inner coupling hose connectors 8, such that the opposed O-rings 6 are interfaced or in sealing engagement, as shown in FIG. 3. FIG. 5 shows schematically some of the interconnected components in this particular embodiment of a garden hose watering system according to the invention.

At the threaded end of the hose clamp collar, on the inner surface thereof, is an annular recess which assists in compressing the circlip onto the hose just behind the barbs on the spigot.

Similarly, the tap connector is formed by snap fitting an inner coupling into one end of a universal body member with the other end of the body member being adapted to screw onto an externally threaded water tap.

In this form (i.e. as a connector) the universal body also performs other functions. For example, it will accept accessories such as a spray nozzle with a 25 mm male thread and becomes an integral part of the spray nozzle. The spray nozzle is connected to the hose by presenting the same bayonet face to an identical bayonet face on the hose joiner/connector.

The hose connector inner coupling is fitted into the universal body by way of a permanent "snap fit", making a hose joiner.

The hose joiner performs two functions, namely (a) connects one hose to another hose, thus acting as a hose joiner or (b) connects hose to a tap, by way of joining to the identical face of the tap connector.

The seals of the connectors and other components are effected by means of two half O rings coming together to form a main seal. The seals do not react to internal fluid pressure so as to force the sealing surfaces together. The seal is recessed from the edge of the fluid passageway so that it is not affected by internal fluid pressure.

The connection and disconnection of components of the system is by way of a bayonet fit. The two faces which come together on adjacent components have coacting bayonet means which secure lock together by counter-rotating one abutting face relative to the face of the adjacent component. The face with bayonet means is identical for all components i.e. there is a common bayonet face with no male or female end. Either end of the hose fitted with these components can thus be connected to the tap or other fittings.

FIG. 2 illustrates how the tap connector of the present invention can be connected to a standard or conventional hose coupling by way of an 18 mm to 25 mm adapter screwing into the tap connector. This enables an 18 mm to standard hose coupling to be connected.

FIG. 2 illustrates how the tap connector of the present invention can be connected to accessories such as a garden spray or any other accessory with an 18 mm female thread. This; can be achieved by way of a converter, 25 mm male to 18 mm male. The 25 mm male adapter screws into the tap connector and the 18 mm male adapter screws into the garden fitting.

The component parts of the fittings for a flexible fluid line as herein disclosed can be fabricated from any suitable material, but plastics materials are preferred due to the concomitant weight and strength benefits, as well as cost The fittings may be manufactured by any conventional technique such as by injection moulding.

It should be appreciated that while most the disclosed details relates to liquids, the fitting is equally applicable to gases, or other fluids, and any necessary modifications having regard to fluid properties and requirements are encompassed within a system of connections made according to the present invention.

Although an exemplary embodiment of the present invention has been shown and described, it will be apparent to those having ordinary skill in the art that a number of changes, modifications or alterations to the invention described herein may be made, none of which depart from the spirit of the present invention. All such changes, modifications, and alterations should therefore be seen as being within the scope of the present invention.

It should be appreciated that the present invention provides a substantial advance in fittings for flexible fluid lines providing all of the herein described advantages without incurring any relative disadvantage.

What is claimed is:

1. A connector for a flexible fluid line, comprising a first universal body member having a passageway extending axially therethrough from one end to an opposite, outer end thereof, an inner coupling member coaxially disposed and fixed within said first universal body member having a passageway extending axially therethrough from one end to an opposite, outer end thereof, and a locking lug depending from a peripheral edge of the outer end of the first universal body member and having an inwardly directing flange about its outer end adapted to connect said first universal body member end to end with a second universal body member; and a second universal body member with an inner coupling member coaxially disposed therein and with a locking lug depending from adjacent a peripheral edge of the second universal body member interfacing with the first universal body member, wherein the first and second universal body members are mutually rotatable relative to one another to effect a bayonet-type coupling wherein the locking lug depending from the first universal body member is located in a peripheral groove formed in a side edge of the inner coupling member of the second universal body member, and wherein the locking lug depending from the second universal body member is located in a peripheral groove formed in a side edge of the inner coupling member of the first universal body member, whereby the outer end of the inner coupling member of the first universal body member interfaces and sealingly engages the outer end of the inner coupling member of the second universal body member.

2. A connector for a flexible fluid line as claimed in claim 1, in the form of a hose-end connector for attachment to a water tap or water cock.

3. A connector for a flexible fluid line as claimed in claim 1, in the form of a hose-end connector for attachment to an accessory attachment.

4. A connector for a flexible fluid line as claimed in claim 1, in the form of a coupling for interconnecting two flexible fluid lines or hoses.

5. A connector for a flexible fluid line as claimed in claim 1, wherein opposed O-rings; are provided in the outer ends of the interfacing inner coupling members for sealing engagement therebetween.

6. A connector for a flexible fluid line according to any one of the preceding claims comprising part of a garden hose watering system.

7. The connector of claim 1, wherein the inner coupling members are snap-fitted into the respective first and second universal body members.

8. The connector of claim 7, wherein the universal body member passageways at the one end is threaded.

9. The connector of claim 8, wherein the inner coupling member has a hose connector portion disposed toward the one end which is adapted to engage the interior of a hose, and wherein the universal body member further comprises: (a) a hose clamp collar threadedly disposed in the universal body member passageway and extending a predetermined distance out the one end, which is adapted for being disposed around the exterior of the hose, and (b) a hoselock circlip disposed in the universal body member passageway for sealing engagement between the hose clamp collar and a hose.

10. The connector of claim 8, further comprising a washer disposed in the universal body member passageway at the one end which abuts the inner coupling member.

* * * * *